United States Patent [19]

Buzio

[11] Patent Number: 5,128,183
[45] Date of Patent: Jul. 7, 1992

[54] MODIFIED POLYOLEFIN FILM WITH STABLE TWIST RETENTION, DEAD FOLD PROPERTIES AND BARRIER CHARACTERISTICS

[75] Inventor: Pierpaolo Buzio, Milan, Italy
[73] Assignee: Borden, Inc., Columbus, Ohio
[21] Appl. No.: 561,023
[22] Filed: Aug. 1, 1990
[51] Int. Cl.⁵ .............................................. B29D 22/00
[52] U.S. Cl. ................................. 428/35.7; 428/332; 428/500; 428/516; 229/87.01; 525/240
[58] Field of Search ............... 428/349, 516, 500, 910, 428/35.7; 229/87.01; 525/240

[56] References Cited

U.S. PATENT DOCUMENTS

| | | |
|---|---|---|
| 2,956,042 | 10/1960 | Underwood et al. |
| 3,036,987 | 5/1962 | Ranalli |
| 3,663,488 | 5/1972 | Kail et al. |
| 4,786,533 | 11/1988 | Crass et al. ........................... 428/349 |
| 4,842,187 | 6/1989 | Janooha et al. ....................... 229/87 |

FOREIGN PATENT DOCUMENTS

| | | |
|---|---|---|
| 288227 | 4/1987 | European Pat. Off. |
| 0288227 | 10/1988 | European Pat. Off. |
| 3514398 | 3/1988 | Fed. Rep. of Germany |
| 5968215 | 5/1987 | Japan |

OTHER PUBLICATIONS

Courtaulds Films, "Shorko Films SHX Transparent Coextruded OPP Films for Twistwrapping".

Primary Examiner—Edith L. Buffalow
Attorney, Agent, or Firm—Kenneth P. Van Wyck; Dennis H. Rainear

[57] ABSTRACT

The present invention is directed to modified polyolefin films with stable twist retention and dead fold properties to be employed in wrapping in general, and particularly in wrapping small items. The films produced by the present invention exhibit improved moisture vapor barrier and oxygen barrier properties. The inventive films are obtained by extrusion and stretching of a ternary mixture comprising (1) isotactic polypropylene; (2) high density polyethylene; and (3) a glassy amorphous low molecular weight resin. Multilayer films are also provided.

17 Claims, 2 Drawing Sheets

MACHINE DIRECTION TENSILE STRENGTHS

MODIFIED POLYOLEFIN FILM WITH STABLE TWIST RETENTION, DEAD FOLD PROPERTIES AND BARRIER CHARACTERISTICS

PRIOR ART

The wrapping of goods, in particular of small items such as candies, sweets, chocolate bars, etc. by twist folding of films, both manually and automatically, has been known for many years.

The materials employed to date have included paper, foil and various films, such as cellophane, high density polyethylene, cast polypropylene, Barex ® nitrile polymer, and polyester.

With the advent of high speed wrapping machines, it was necessary to have recourse to materials with particular characteristics, and to this end, certain films of rigid, amorphous polymers such as polyvinylchloride (PVC), polystyrene and acrylic copolymers have been employed. Said materials, however, do not fully possess the physical characteristics required for optimal packaging results, such as high rigidity, twist retention, oxygen and moisture barrier, high slippage properties, and easy cutting without brittleness.

Polypropylene and polyethylene films, which would have cost advantages with respect to the above mentioned materials, cannot, on the other hand, be employed in an unmodified form because of their lack of twist retention, and moderate permeability.

Various attempts to employ oriented films for this type of wrapping have exhibited only limited success.

Thus, in the Japanese Patent 59-68212 (Mitsui Toatsu Chemical Co.) a polyolefin film with improved rigidity and twist retention is obtained by mono-axial longitudinal orientation. Such a film, however, has poor properties in the transverse direction and has a tendency to tearing and fissuring, and its use is therefore limited to longitudinal twist wrapping.

In the German Patent DE 3514398A1 (Hoechst) a biaxially oriented film is described consisting of polypropylene, inorganic fillers and polymers such as polyamides or polymethylmethacrylate. This type of film, however, shows poor twist retention.

In the European Application 0288227, published Oct. 26, 1988 (Exxon Chemicals), a biaxially-oriented film is described which is obtained by extrusion of a two component blend consisting of a polypropylene compound, (or a copolymer of propylene with up to 20 weight percent of another olefin, e.g. ethylene) and 20 to 30% by weight of a low molecular rosin or resin. The process described therein for obtaining extruded oriented films presents serious difficulties in the extrusion and orientation stages, because of the low viscosity of the melt, low softening point, and tendency to stick to the stretching rolls, so that this process is not readily feasible on a commercial scale. Achieving compatibilization of polypropylene and polyethylene by selection and mixing of a low molecular weight resin is not taught, but rather blending of the polypropylene with a copolymer of propylene and another olefin is utilized.

Similarly, U.S. Pat. No. 3,663,488, issued May 16, 1972 to Kail, et al., teaches the use of certain hydrogenated hydrocarbon polymers blended with polyolefin materials to produce a two component composition useful as an extruded film for twist wrapping.

U.S. Pat. No. 4,842,187 issued Jun. 27, 1989 to Janocha, et al., describes an opaque, biaxially draw-oriented thermoplastic film for candy twist wrapping. The film of Janocha, et. al is formed from a polymer mixture comprising from about 40 to about 60% by weight of polypropylene and from about 35 to about 55% by weight of polystyrene, and from about 5 to about 15% by weight of an inorganic or organic filler.

U.S. Pat. No. 4,786,533, issued Nov. 22, 1988 to Crass, et al., teaches the preparation of a twist wrap film produced from a polypropylene base layer and a polydialkylsiloxane top layer. The polypropylene base layer additionally contains a low molecular weight hydrocarbon resin in an amount of about 10 to 40% by weight. The polypropylene therein is preferably an isotactic propylene homopolymer or a copolymer of ethylene and propylene having an ethylene content of less than about 10% by weight. This is a two component base layer.

U.S. Pat. No. 2,956,042 issued Oct. 11, 1960 to Underwood, et al., teaches the preparation of a polyethylene film into which has been incorporated 0.1 to 2.0 parts by weight of polypropylene.

U.S. Pat. No. 3,036,987 issued May 29, 1962 to Ranalli teaches the blending of isotactic polypropylene with linear amorphous copolymer of propylene and ethylene, wherein the ethylene content is from 30 to 70% by weight.

Recently, Courtaulds Films has marketed a transparent coextruded OPP film (SHX 800) for twist wrapping. However, the film consists of 3 layers of modified homopolymer.

A. Schulman Plastics has marketed a resin masterbatch (POLYBATCH OPR 6420) for the production of BOPP films with higher stiffness and improved barrier properties.

Compatibilization of polypropylene materials and high density polyethylene materials through the incorporation of a glassy amorphous low molecular weight resin is not previously known.

Therefore, it would be desirable to have a modified polyolefin film which: (1) possesses the cost advantages of polypropylene and polyethylene; (2) is clear or pigmentable; (3) is easily processed and extruded; (4) exhibits good twist retention; (5) exhibits good dead fold retention; (6) exhibits good oxygen barrier properties; (7) exhibits good moisture barrier properties; (8) exhibits good impact strength and tear resistance; and (9) is a blend rather than a copolymer.

SUMMARY OF THE INVENTION

We now have found that it is possible to obtain a biaxially oriented film with these desired properties by using a compatibilized blend of polypropylene and polyethylene, said film particularly characterized by good clarity, twist retention and dead fold properties, low water vapor transmission and low oxygen transmission. The film is therefore suitable for packaging uses in general, and particularly for packaging small items, by twist wrapping. The films of the present invention comprise a ternary mixture of (1) isotactic polypropylene; (2) high density polyethylene; and (3) a glassy, amorphous low molecular weight resin.

According to the present invention, the process for making said film comprises in one embodiment the steps of:

(a) mixing the three components to obtain a homogeneous blend;
(b) extruding the blend to obtain a sheet; and (c) stretching the sheet in both the longitudinal and the transverse directions to obtain the biaxially oriented film.

DETAILED DESCRIPTION OF THE INVENTION

Figure 1:
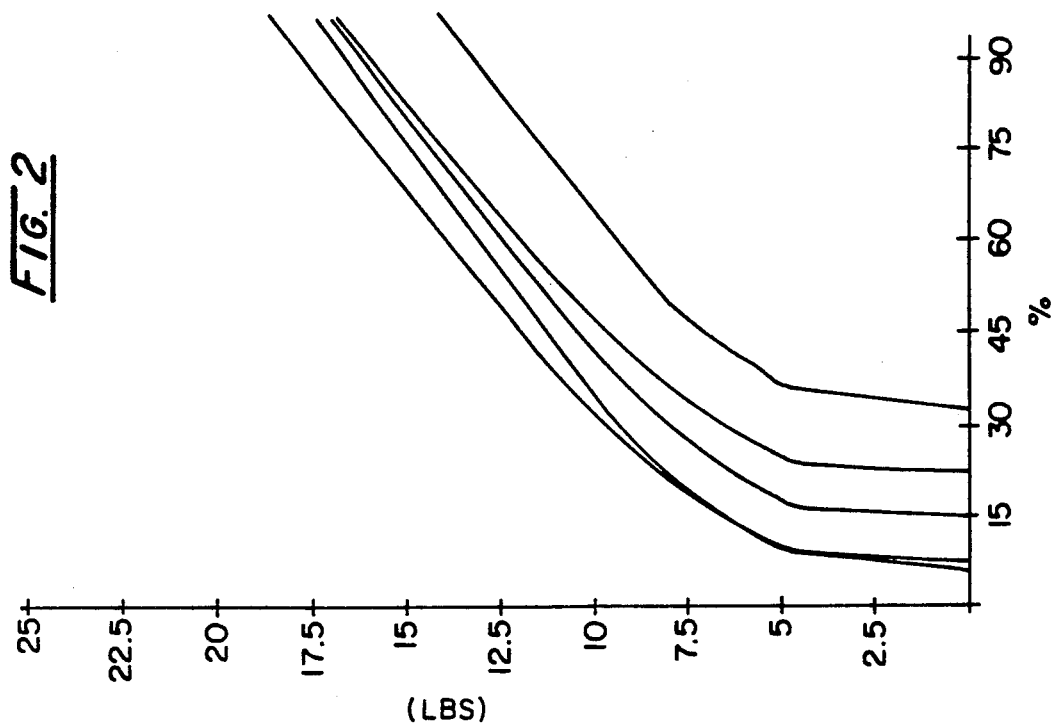

The film of the present invention comprises at least a ternary mixture of (1) isotactic polypropylene; (2) high density polyethylene; and (3) an amorphous, glassy, low molecular weight resin. Additional components or additives are also useful herein and the mixture can comprise two or more glassy resins. Thus, the ternary systems herein can include quaternary and higher systems.

The process for its preparation comprises in another embodiment the following steps:

(a) mixing of the three or more components, preferably dry mixing;

(b) extrusion or melt blending of the mixture to obtain a homogeneous composition;

(c) cooling and pelletizing the homogeneous composition;

(d) forming a sheet by extrusion of the homogeneous composition; and (e) stretching the extruded sheet in both longitudinal and transverse directions to form a film.

It is preferred, but not required, to cool and pelletize the extruded composition and then re-extrude the pelletized composition. This improves the homogeneity and mixing relative to that obtained by simply hot extruding the three component mixture. However, for some applications and uses of the films of the present invention, the additional cooling and pelletizing is not necessary. It is also possible to preblend and/or pre-pelletize a mixture of polypropylene and glassy resin.

The three components of the mixture according to the present invention preferably have the following characteristics:

Component 1: Isotactic polypropylene having a melt flow rate between 0.5 and 10 and more preferably between 0.5 and 5, when measured at 230° C./2.16 Kg. and a melting point (MP) between 155° and 170° C. Alternatively, instead of polypropylene, a propylene-ethylene copolymer may be employed containing between 0.1 and 10% ethylene by weight, the ethylene being distributed randomly or in blocks in the copolymer, said copolymer preferably having a melting point of between about 140° and 165° C. It is preferred herein to have a polypropylene or copolymer with a melting point above 140° C.

Component 2: High density polyethylene (HDPE) having a melt flow index (MFI) between 0.1 and about 40 when measured at 190° C./5.0 Kg. and density between 0.940 and 0.965 grams/cm$^3$. By "HDPE" herein is meant both linear high density polyethylene and conventional high density polyethylene which contains some degree of branching in the chains.

Component 3: An amorphous, low molecular weight, glassy resin which is partially or totally hydrogenated and having a molecular weight of between about 500 and about 2,000 and a softening point (ring and ball) of between about 70° and about 170° C. Some unsaturation of the glassy resin is acceptable up to an iodine number of about 50, however, increasing the amount of unsaturation increases the undesirable color and odor.

The amorphous, low molecular weight, glassy resin (Component 3 above) is selected from the group consisting of pine resins, such as rosin derivatives, and polymers derived from the polymerization of terpene monomers, dimers, polymers and resins, and alicyclic, monocyclic and bicyclic monomers, and mixtures thereof. Preferred glassy resins are saturated terpenes demonstrating true mixability with polypropylene.

Also suitable herein as the third component are hydrocarbon polymers and resins such as aliphatic resins, aromatic resins, aliphatic/aromatic copolymer resins, indene resins, coumarone and styrene resins, C$_9$ hydrogenated resins, phenol resins such as alkyl-phenol and terpene-phenol resins, and mixtures thereof.

Suitable compatible hydrogenated hydrocarbon polymers are those which have an iodine value (ASTM D-1959) less than 50, a drop softening point above about 70° C. and an average molecular weight (Rast) of about 500 and above. Such materials include, but are not limited to, the polymers produced by the hydrogenation of the resinous polymerization products obtained by the catalytic polymerization of mixed unsaturated monomers derived from the deep cracking of petroleum, as well as higher polymers obtained by polymerization and/or copolymerization of terpene hydrocarbons such as the monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes, followed by hydrogenation under pressure. Particularly useful starting materials which can be polymerized and then hydrogenated to form the third component glassy resin employed in this invention are mixtures of unsaturated monomers composed essentially of dienes and reactive olefines derived from deep cracking petroleum, the vinyl-aromatic hydrocarbon cuts or fractions separated by distilling cracked petroleum, and terpene mixtures.

In a preferred embodiment, the weight percentage composition of the ternary mixture in the films of the present invention is as follows: polypropylene (or propylene-ethylene copolymer) 40 to 90%; polyethylene 5 to 25%; and glassy resin 5 to 35%.

To achieve the desired twist wrap retention and dead fold properties, it is preferred that at least 15% by weight of the ternary mixture be glassy resin. It is noted in films of the present invention that when the low molecular weight glassy resin is present in the film formulation in an amount above about 15% by weight, the resulting extruded film is usually tacky. For some applications, such tackiness may be acceptable, even desirable. For applications in which such tackiness is not preferred, less than 15% by weight glassy resin is employed, or alternatively a dual-layer or multilayer film structure is produced by coextrusion, laminating or in any other way contacting or combining the tacky film with at least one less tacky or non-tacky layer. Such a layer, often called a skin layer, is preferably selected to receive a printing ink. A homopolymer of polypropylene is effective herein as the skin layer over a core layer of the inventive film.

The three components are preferably admixed in the dry state and extruded by any conventional method to obtain a molten, homogeneous composition. The composition can be, but need not be, pelletized, which improves the homogeneity.

The cooled composition is, or the pellets are, then extruded to obtain a sheet which is subsequently stretched in both the longitudinal and the transverse directions, generally at a temperature of between 100° and 180° C. and at stretch ratios of between 3.5/1 and 10/1 in each direction. It is preferred herein that the stretching or orienting in the longitudinal direction be done at 100° to 140° C. with a stretch ratio of 3.5/1 to 8/1 and in the transverse direction at 130° to 180° C. with a stretch ratio of 5/1 to 10/1.

The stretching process may be carried out on, for example, conventional machines such as tenter frame and double bubble types. The biaxial orientation of the film can be a simultaneous or sequential process.

An extruded film is thus obtained having a preferred thickness of between 15 and 35 microns, which is transparent, has high rigidity and resistance to tearing and fissuring, good slippage properties, easy cutting without brittleness and good dead fold and twist retention. The films of the present invention provide cost advantage over the use of foil, paper, cellophane, polyester, PVC, Barex ® nitrile polymer, and polystyrene; and display performance advantages over the use of conventional cast polypropylene and high density polyethylene films.

One advantage of the compatibilized and modified polyethylene/polypropylene films of the present invention relative to conventional PVC films is that the instant films are approximately one-third less dense than PVC films. Thus a substantial cost savings due to wrapping of more items per pound of film is achieved by the invention relative to PVC films.

The desirable transparency of the film is obtained by the compatibilizing effect of the third component (the amorphous, glassy, low molecular weight resin or resins) on the blend of polypropylene and polyethylene. Without the third component, the polypropylene and polyethylene are so incompatible as to produce opaque, or non-transparent, films. Thus the compatibilizing effect of the low molecular weight resin is very important to the invention. In certain formulations of the present invention, or under certain extrusion conditions, a slight haze or opacity of the film is present due to surface roughness. This is readily overcome by the addition of skin layers of homopolymer of polypropylene. The ability of the skin layers to eliminate the haze in the inventive core layer illustrates that the haze is predominantly a function of surface roughness and not caused by incompatability of the components.

The order and method of mixing the three components in the compositions used to prepare the films of the present invention is not critical. The polypropylene or propylene-ethylene copolymer can be melt blended with the HDPE, and the low molecular weight glassy resin added later. Alternatively, and preferably the polypropylene or propylene-ethylene copolymer can be melt blended with the low molecular weight glassy resin, and the HDPE can be added later. In yet another embodiment, the three components can be combined and mixed simultaneously. Melt blending (twin screw, Banbury, etc.) is operative herein to achieve the desired homogeneous composition containing the three components.

The present ternary composition used to produce the inventive films is more practical to melt blend than the conventional binary film compositions containing only the polypropylene and a low molecular weight resin because of the large viscosity differences between these components. The presence in the instant ternary composition of the polyethylene greatly facilitates the mixing and homogeneity of the present compositions relative to the prior art binary compositions.

It has also been discovered that the addition of the HDPE to the composition reduces the amount of low molecular weight glassy resin needed to achieve the required twist retention characteristics. However, reducing the level below about 5% by weight glassy resin in the ternary composition results in loss of compatibilization of the polypropylene or propylene-ethylene copolymer and the HDPE. Increasing the weight percent of glassy resin in the ternary composition reduces the melting point of the cooled homogeneous ternary composition and increases its glass transition temperature.

Figure 2:
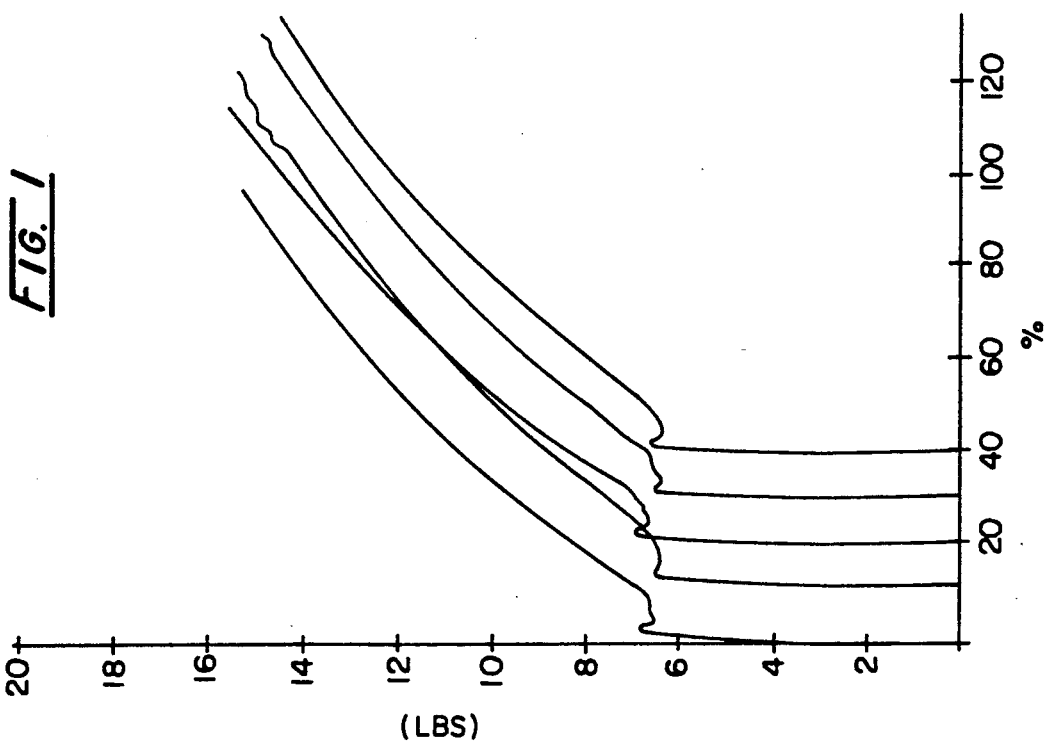
Figure 3:
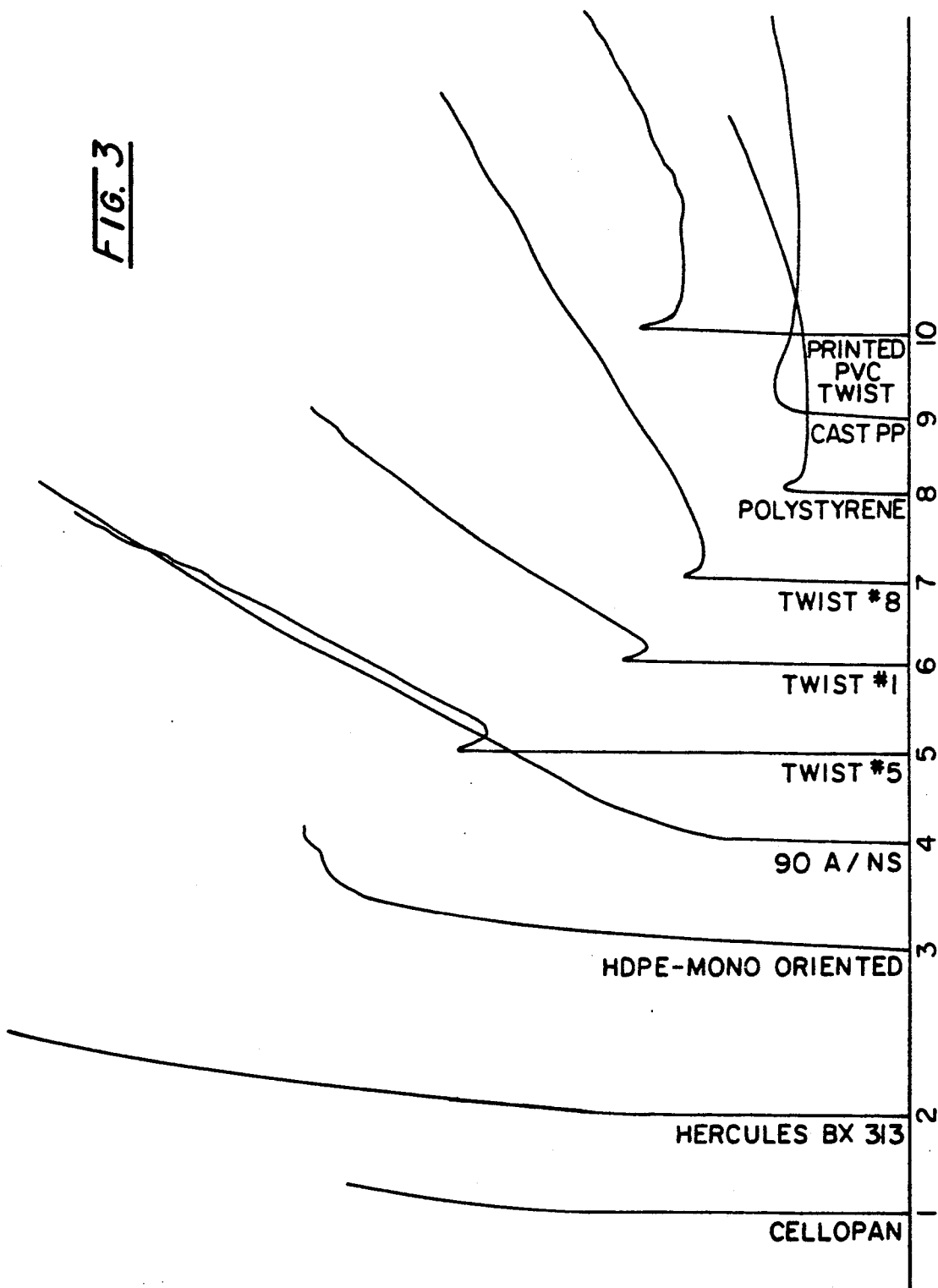

The extruded films exhibit twist retention superior to prior art polypropylene or polyethylene films. A specific parameter to which the twist retention is correlated is the non-recoverable yield point of the load elongation curves of the films according to the present invention, as shown in FIG. 1 in comparison with the curves of FIG. 2 relating to conventional BOPP films. The abscissae in the figures represent percent elongation and the ordinates the load in pounds. As shown in FIG. 3, the inventive films of curve 5 and curve 7 demonstrate permanent deformation and the shoulder on the curves indicate the non-recoverable yield point. The absence of a similar shoulder in FIG. 2 for standard non-modified oriented polypropylene (OPP) films indicates elastic deformation and hence, recoverability. FIG. 3 shows the degree of non-recoverable yield points for several films. The numbered curves in FIG. 3 represent: 1=cellopan; 2=Hercules BX313; 3=mono oriented high density polyethylene; 4=Proponite 90 A/NS; 5=Twist 5 which is a white pigmented ternary inventive film comprising 70% polypropylene, 20% Escorez resin, and 10% HDPE; 6=Twist 1 which is a film from a binary composition of 78% polypropylene and 22% Escorez 5320 resin; 7=Twist 8 which is an inventive quaternary film of 70% polypropylene, 12% Escorez 5320 resin, 5% Arkon P140 resin, and 13% HDPE; 8=polystyrene; 9=cast polypropylene; and 10 is a conventional PVC film.

In addition to improved twist retention, the films of the present invention also exhibit improved dead fold properties relative to conventional oriented polyolefins, such as BOPP, and the like. By "dead fold" herein is meant a measure of the film's ability to retain a fold or crease. Materials with excellent dead fold property include, for example, metal foils, paper, polystyrene and PVC. A simple test for dead fold property is performed by stamping a 180° fold in the film at ambient temperature and then measuring the angle to which the fold opens thereafter. The lower or smaller angles are desirable because this indicates greater dead fold retention. As shown in Table 5, the extruded films of the present invention (Twist 5 and Twist 8) exhibit dead fold property better than prior art oriented polypropylene films (90 A/NS) and the Hercules binary film.

It is believed, but the inventor does not wish to be limited to the theory that, improved twist retention, or dead fold property, of the films of the present invention is related to achieving a non-recoverable yield point on the stress/strain relationship. One feature of the film of the present invention is that it exhibits a non-recoverable yield point at a very low strain (elongation). This yield point is a function of the percentage of each component present in the ternary composition. Thus it has been discovered that the desired non-recoverable yield point in the stress/strain relationship for the films of the present invention is attained when the ternary composition comprises:

| | |
|---|---|
| polypropylene (or propylene-ethylene copolymer) | 40–90 wgt. % |
| polyethylene | 5–25 wgt. % |
| low molecular weight glassy resin | 5–35 wgt. % |

Ternary compositions of 60–70% high density polyethylene, 10–20% propylene-ethylene copolymer, and 10–30% low molecular weight glassy resin did not produce acceptable film, due to inability to be orientated. This is overcome in the present invention by utilizing 40 to 90 weight percent polypropylene or propylene-ethylene in combination with the HDPE and glassy resin, to provide desired rigidity and ability to orient the film.

It has been discovered that increasing the level of low molecular weight glassy resin in the film formulation has a strong positive effect on machine direction yield strength, the non-recoverable yield point, and dead fold properties. Thus, for maximizing dead fold properties, increased levels of the low molecular weight glassy resin in the film formulation are preferred. Increasing the amount of high density polyethylene in the film also has a positive effect on processing by increasing the flowability of the molten homogenous composition, and a positive effect on the dead fold characteristic. Thus, when dead fold property is more important than twist retention, a preferred embodiment of the present invention would have 30–35% by weight of the low molecular weight glassy resin and 20–25% by weight of high density polyethylene, with the remainder being essentially polypropylene or propylene-ethylene copolymer.

Another significant advantage of the films of the present invention is the oxygen and moisture barrier properties exhibited. Packaging should ideally, but not by way of limitation, provide not only protection from dust, dirt or other contamination, but also should provide protection from spoilage often caused by oxidation and/or moisture. However, improved barrier properties against oxygen and moisture transmission are generally not pre-requisites for twist wrapping film applications because no sealing is generally involved in twist wrapping. The films of the present invention can provide about 50% improvement in oxygen barrier and up to about 40% improvement in moisture barrier properties relative to the prior art unmodified oriented polypropylene. Table 3 illustrates the water vapor transmission and oxygen permeability of four samples of the inventive ternary film compared to control samples of propylene/resin films (Films E and F) and unmodified oriented polypropylene film (Film G). The inventive unpigmented films exhibited 0.22 and 0.18 grams of water vapor transmitted per 100 square inches per 24 hours, per mil, surprisingly less than the control samples which exhibited a value of 0.31. The oxygen permeability of the films of this invention were also less than that of the prior art control samples: 47.7, 53.5, 42.1 and 42.6 cc per 100 square inches per 24 hour per mil, versus 94.8 for the BOPP control sample (Film G). Pigmented films (C and D) of the present invention showed better oxygen and moisture vapor barrier properties than unpigmented films (A and B), as shown in Table 3. Although not presented in Table 3, an inventive quaterary film Twist 8 (discussed above and represented in FIG. 3 curve 7) exhibited values of 59.8 and 0.21 for the $O_2TR$ and WVTR, respectively, for 100 gauge film.

Table 3 also illustrates the improved elastic modulus (ASTM D882) of the films of the present invention relative to conventional or prior art BOPP film.

Table 4 illustrates the results of twist retention testing of an Exxon Film, a Courtaulds Shorko SHX 800 film, and an inventive ternary white pigmented film (Twist 5) comprising 70% polypropylene, 20% Escorez resin and 10% HDPE. The inventive film exhibits higher twist retention (300°) relative to the binary films (270°). The test was performed by folding a film sample once in the middle along the transversal direction, then clamping the film tightly on one side with a fixed clamp and on the other side (at a distance of 2 mm) with a rotating clamp. After one rotation of 360° of the clamp, the sample was quickly released and the retained angle was measured. Thus, higher retained angles represent better twist retention.

Due to the presence of the above stated characteristics or properties, the films according to the present invention may be successfully employed for packaging in general and for packaging small items in particular, by wrapping with both lateral and longitudinal twist with the aid of high speed machines. The films of the present invention are, for example, twisted 1½ times or 540 degrees. Once so twist wrapped, the twisted film retains or essentially retains its twisted state and has a reduced tendency to unwrap relative to prior art oriented polypropylene films. It has been discovered that the development of a non-recoverable yield point in an extruded film of the present invention is time dependent. Thus an extruded film measured for twist retention immediately after extrusion might not exhibit the desired twist retention, yet the same film when tested several hours to several days later will exhibit acceptable twist retention. The inventor believes, but does not wish to be limited to, the theory that attaining a non-recoverable yield point in an extruded film according to this invention is enhanced by allowing the film to age and/or the crystallization to advance. Machine direction yield strength and the development of the non-recoverable yield point are, however, strongly dependent on ambient aging, and will increase about 10% within seven days of ambient aging. By comparison, a 100% polypropylene film will only increase in yield strength but 2% in the same time frame.

The films according to the invention may be obtained also as co-extruded and multi-layer structures, such as one side sealable films, two sides sealable films, coated films, tinted films, cavitated films, untreated films, one side treated films, two sides treated films, and metallized plastic films. The inventive films can also be laminated to conventional oriented polypropylene films, polyester films, and others to impart twist retention and dead fold properties to such multilayer composite structures.

The inventive films can furthermore be pigmented with known white and color pigments or fillers such as calcium carbonate or titanium dioxide to provide desired opacity. To the film formulations can also be added known organic fillers, such as nylon 11 and polystyrene. Alternatively, the films can be used if desired in conjunction with colored or metallized plastic films, or with foils. If antistatic character is desired, known antistatic compositions may be incorporated in the film, as well as slip and antiblocking additives.

The following examples are reported to illustrate the preparation and the characteristics of the films according to the invention, and are not a limitation of the invention.

EXAMPLE 1

72 parts by weight of isotactic polypropylene (Himont, Moplen S38F) having MFR=1.8 and MP: 166° C., 12 parts by weight linear polyethylene (DSM, Stamylex 7058) having MFI=12, density 0.952 and MP 131° C., and 16 parts by weight of hydrogenated polycyclopentadiene (Exxon, Escorez 5320) having a molecular weight of 650 and softening point of 120° C. were mixed in the dry state and fed to an extruder to obtain a homogeneous molten composition, which was then cooled and pelletized. A multilayer film, prepared by extrusion of the pelletized homogeneous composition, was then stretched in a planar stretching Brückner machine with a stretch ratio of 4:1 in the longitudinal (machine) direction at a temperature of between 120° and 124° C., and with a stretch ratio of 9:1 in the transverse direction at a temperature of between 145° and 168° C. The obtained film is 22 microns thick and shows good transparency and rigidity. The main characteristics of the film are reported in Table 1.

The film was employed in packaging hard candies using a high speed twist wrapping machine, in comparison with a conventional rigid PVC 26 micron thick film. The film of the present invention exhibited stable twist retention at least equivalent to that of the PVC film, and at a reduced thickness and density relative to the PVC film.

EXAMPLE 2

Operating as in Example 1, a film was prepared employing the following mixture: isotactic polypropylene (Neste VB 1943B) having MFR=2 and MP 166° C.; 75 parts by weight linear polyethylene (Solvay, Eltex HD B4020) having MFI=6, density 0.954, MP 132° C., and 15 parts by weight of a hydrocarbon resin (Arakawa, Arkon P125) of MW 820 and softening point 125° C.

The film was very rigid, slippery, with good transparency and good resistance to tearing and fissuring.

The film was printed and used for packaging soft candies with good results.

The characteristics are reported in Table 1.

EXAMPLES 3 to 5

Operating as in Example 2 and with the same amounts of the three components, different types of linear polyethylene were tried, and precisely:

In Example 3: Linear polyethylene (Solvay, Eltex HD1016) MFI=5, density 0.963, MP 136° C.;

In Example 4: Linear polyethylene (DSM, Stamylex 9089F) MFI=25, density 0.963, MP 136° C.;

In Example 5: Linear polyethylene (BP Chem. Rigidex RD6070Fa) MFI=20, density 0.963, MP 136° C.

The characteristics of the obtained films, as reported in Table 1, are similar to the characteristics of the films of Example 2. With increasing density of the polyethylene a slight decrease of the transparency was observed.

EXAMPLE 6

The process of Example 1 was followed substituting a statistical propylene-ethylene copolymer (Solvay, ELTEX KL 415) for isotactic polypropylene. The propylene-ethylene copolymer had approximately 2.5% ethylene. The remaining components were unchanged. The mixture was melted and homogenized in a twin-screw extrusion apparatus, granulated and then extruded into a film and oriented in two directions. Stretch ratios of 4.8:1 (longitudinal) and 9.5:1 (transversal) were employed.

The resulting film exhibited good mechanical and optical characteristics and excellent twist retention.

The characteristics are reported in Table 1.

EXAMPLE 7

To the polymer mixture of Example 1, 5% by weight of a white pigment ($TiO_2$) was added to each of the two skin layers of homopolymer polypropylene.

The opaque lucent film of 25 micron thickness obtained had the desired mechanical characteristics and was used instead of waxed paper (52 g/m$^2$) for wrapping soft candies.

The characteristics are reported in Tables 1, 2, 3, 4 and 5.

TABLE 1

| Example | Thickness (Microns) | Tensile Strength (Kg/mm$^2$) | | Elongation At Break (%) | |
|---|---|---|---|---|---|
| | | L | T | L | T |
| 1 | 22 | 11.2 | 24 | 240 | 40 |
| 2 | 25 | 10 | 24 | 180 | 28 |
| 3 | 20 | 15 | 27 | 235 | 47 |
| 4 | 25 | 10.6 | 24 | 260 | 46 |
| 5 | 17 | 12.7 | 28 | 268 | 45 |
| 6 | 20 | 9.8 | 24 | 195 | 48 |
| 7 | 25 | 11.4 | 25 | 220 | 40 |
| Courtoulds Shorko SHX 800 | 24 | 11.9 | | 160 | |

TABLE 2

| Examples | L Yield Strength (Kg/mm$^2$) | Haze | Gloss |
|---|---|---|---|
| 1 | 4 | 1.0 | 85 |
| 2 | 5.3 | 1.2 | 84 |
| 3 | 7.0 | 1.4 | 80 |
| 4 | 5.6 | 1.5 | 78 |
| 5 | 7.1 | 1.5 | 78 |
| 6 | 4.0 | 1.2 | 82 |
| 7 | 4.2 | 75 | 86 |
| Courtaulds Shorko SHX 800 | 4.9 | 1.4 | 95 |

L = Longitudinal
T = Transversal
Methods of test:
Tensile Strength, elongation at break, yield strength: ASTM D 882-80
Haze: ASTM D 1003-61
Gloss: ASTM D 2457-70, at 45°

TABLE 3

| | Present Invention Films | | | | Control Films | | | |
|---|---|---|---|---|---|---|---|---|
| | A | B | C | D | E | F | G | H |
| Elastic Modulus ASTM D882 ×10$^3$ psi | 387 | 359 | 363 | 355 | | 445 | 296 | 349 |
| WVTR[1] ASTM F372 | 0.22 | 0.18 | 0.17 | 0.18 | 0.14 | 0.13 | 0.31 | 0.21 |
| $O_2$ TR[2] | 47.0 | 53.5 | 42.1 | 42.6 | 44.9 | 36.6 | 94.8 | 51.4 |

TABLE 3-continued

|  | Present Invention Films | | | | Control Films | | | |
| --- | --- | --- | --- | --- | --- | --- | --- | --- |
|  | A | B | C | D | E | F | G | H |
| ASTM D3985 |  |  |  |  |  |  |  |  |
| % glassy resin | 20 | 12 | 15 | 17.5 | 20 | 30 | 0 | unknown |

Film A — 88-95 gauge, polypropylene 70 weight %, polyethylene 10 weight %, Escorez 5320 20 weight %.
Film B — 71-74 gauge, polypropylene 70 weight %, polyethylene 13 weight %, Escorez 5320 12 weight %.
Film C — 90 gauge, white opaque (65% light transmission), polypropylene 71 weight %, polyethylene 10 weight %, Arkon P125 15 weight %, TiO₂ 4 weight %.
Film D — 115-120 gauge, white opaque (49% light transmission): polypropylene 51.5 weight %, polyethylene 25 weight %; Arkon P125 17.5 weight %, CaCO₃ 6 weight %.
Film E — prepared following the Example 1-a in European Patent Application 0288227 (Exxon) using a 50:50 concentrate blend of molten polypropylene and low molecular weight resin (Escorez 5320). The concentrate blend and isotactic polypropylene were melt blended at 40:60% by weight, respectively, and extruded to form an 80 gauge film.
Film F — same concentrate as in Film E, but mixed with polypropylene at 60:40% by weight as in Example 1-b of said Patent Application; 80 gauge film.
Film G — Proponite 90 A/NS, SRN0A261E-4, 91 gauge, biaxially oriented polypropylene.
Film H — Courtaulds Shorko SHX800, 95 gauge.
¹reported in units of gm/100 in.²/24 hours per mil @ 100° F., 90% RH
²reported in units of cc/100 in.²/24 hours per mil @ 23° C., 50-75% RH

TABLE 4

Twist Retention

| Sample # |  | Retained Angle | Percentage Retention |
| --- | --- | --- | --- |
| 1. | Control Film (Exxon, 30% Escorez modifier) | 270° | 75 |
| 2. | Control Film (Shorko SHX 800 from Courtaulds) | 270° | 75 |
| 3. | Inventive Film ("Twist 5") | 300° | 83 |

TABLE 5

DEAD FOLD PROPERTY ANALYSIS
Retention Angle, in degrees (and % crease retention)
Sentinel Sealer Ambient/0.5 sec. dwell/20 PSI/2 min. to reading

|  | Invention | | Controls | | | |
| --- | --- | --- | --- | --- | --- | --- |
|  | FIAP TWIST #5 | FIAP TWIST #8 | HERC. BX313 | 90 A/NS | FIAP Twist #1 | Shorko SHX 800 |
| MD I/I | 90(50) | 100(44) | 115(36) | 145(19) | 75(58) | 75(58) |
| O/O | 95(47) | 95(47) | 130(28) | 180(0) | 110(39) | 92(49) |
| TD I/I | 75(58) | 95(47) | 120(33) | 150(17) | 75(58) | 79(56) |
| O/O | 90(50) | 90(50) | 130(28) | 150(17) | 90(50) | 130(28) |
| Overall Average | 85(51) | 95(47) | 130(31) | 155(13) | 85(51) | 94(48) |

I/I indicates inside to inside fold from a wound reel
O/O indicates outside to outside fold from a wound reel
Lower degree values and higher crease retention represent better dead fold.
Twist 1 is a binary system of 75% polypropylene and 25% Escorez 5320 resin.
Twist 5 is an inventive pigmented ternary system of 70% polypropylene, 20% Escorez 5320 resin and 10% HDPE.
Twist 8 is an inventive quaternary system of printed film of 70% polypropylene, 12% Escorez resin, 5% Arkon P140 resin, and 13% HDPE.

That which is claimed is:

1. A biaxially oriented polyolefin film with improved twist retention, and dead fold property, and reduced water vapor transmission rate and oxygen transmission rate, comprising a mixture of (1) a polymer of propylene selected from the group consisting of isotactic polypropylene and propylene-ethylene copolymers; (2) high density polyethylene; and (3) at least one glassy, amorphous, low molecular weight resin, wherein the low molecular weight resin is present in an amount greater than 5 percent by weight.

2. The film according to claim 1, wherein said polypropylene has a melt flow rate of between 0.5 and 10, as measured at 230° C./2.16 Kg. and a melting point between 155° and 170° C.

3. The film according to claim 1, propylene is a propylene-ethylene copolymer which has a content of ethylene of between 0.1% and 10% by weight, and the ethylene units are distributed randomly or in blocks in the copolymer.

4. The film according to claim 1, wherein said polyethylene has a melt flow index of between 0.1 and 40, as measured at 190° C./5.0 Kg. and a density of between 0.940 and 0.965.

5. The film according to claim 1, wherein said glassy resin is at least partially hydrogenated, has a molecular weight of between 500 and 2,000, and has a softening point of between 70° and 170° C.

6. The film according to claim 1, wherein said glassy resin is selected from the group consisting of pine resins constituted by rosin derivatives, polyterpene resins, and mixtures thereof.

7. The film according to claim 1, wherein said glassy resin is selected from the group consisting of aliphatic hydrocarbon resins, alicyclic hydrocarbon resins, aromatic hydrocarbon resins, aliphatic-aromatic hydrocarbon copolymer resins, and mixtures thereof.

8. The film according to claim 1, wherein said glassy resin is selected from the group consisting of alkyl-phenolic, alkyl-terpene resins, and mixtures thereof.

9. The film according to claim 1, wherein said glassy resin is selected from the group consisting of polymers derived from the polymerization of terpene monomers, terpene dimers, alicyclic monomers, monocyclic monomers, bicyclic monomers, and mixtures thereof.

10. The film according to claim 1, wherein the mixture consists of between 40 and 90% by weight propylene polymer, between 5 and 25% by weight polyethylene, and between 5 and 35% by weight glassy resin.

11. The film according to claim 1, wherein the film is a co-extruded or multi-layer structure.

12. The film according to claim 1, further comprising white or colored pigments.

13. A package item, wherein the item is packaged in the film of claim 1.

14. The film of claim 1 wherein the water vapor transmission through the film is less than 0.22 grams water per 100 square inches of film per 24 hours per mil when measured at 100° F. and 90% relative humidity.

15. The film of claim 1 wherein the oxygen transmission is less than 54 cubic centimeters of oxygen per 100 square inches of film per 24 hours per mil when measured at 23° C. and 50-75% relative humidity.

16. A multilayer composite film structure comprising the film of claim 1.

17. The film of claim 1 wherein two glassy resins are present in the mixture.

* * * * *